United States Patent
Owen et al.

(10) Patent No.: US 12,036,973 B2
(45) Date of Patent: Jul. 16, 2024

(54) CONTROL SYSTEM FOR CONTROLLING TORQUE DISTRIBUTION

(71) Applicant: JAGUAR LAND ROVER LIMITED, Warwickshire (GB)

(72) Inventors: Simon Owen, Coventry (GB); Karl Richards, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/042,310

(22) PCT Filed: Aug. 20, 2021

(86) PCT No.: PCT/EP2021/073199
§ 371 (c)(1),
(2) Date: Feb. 21, 2023

(87) PCT Pub. No.: WO2022/038289
PCT Pub. Date: Feb. 24, 2022

(65) Prior Publication Data
US 2023/0331212 A1  Oct. 19, 2023

(30) Foreign Application Priority Data

Aug. 21, 2020 (GB) ..................... 2013081

(51) Int. Cl.
*B60W 40/06* (2012.01)
*B60W 10/119* (2012.01)
(Continued)

(52) U.S. Cl.
CPC .......... *B60W 10/119* (2013.01); *B60W 10/14* (2013.01); *B60W 30/18127* (2013.01);
(Continued)

(58) Field of Classification Search
CPC ............... B60W 10/119; B60W 10/14; B60W 30/18127; B60W 40/06; B60W 2520/10; B60W 2720/403
See application file for complete search history.

(56) References Cited

U.S. PATENT DOCUMENTS 9,260,089 B2   2/2016 Schuler et al.
11,780,437 B2 * 10/2023 Woodley .............. G05D 1/0223
                                                        701/2
(Continued)

FOREIGN PATENT DOCUMENTS

EP    0577256 A1   1/1994
GB    2519024 A    4/2015
(Continued)

OTHER PUBLICATIONS

International Search Report and Written Opinion of the International Searching Authority for International application No. PCT/EP2021/073199 dated Dec. 1, 2021.
(Continued)

*Primary Examiner* — Justin Holmes
(74) *Attorney, Agent, or Firm* — Carlson, Gaskey & Olds, P.C.

(57) ABSTRACT

Aspects of the present invention relate to a control system for controlling torque distribution between a first axle (110) and a second axle (120) in a vehicle (100), the control system comprising one or more controllers. The control system is configured to detect that the vehicle is in overrun and detect the vehicle speed. When the vehicle is in overrun and the vehicle speed is below a first speed threshold then the torque distribution is controlled to reduce overrun torque to the first axle and to increase overrun torque to the second axle. The vehicle may be a hybrid vehicle comprising an internal combustion engine (ICE) (201), a belt integrated
(Continued)

starter generator (B-ISG) (205) and an electric rear axle drive (ERAD) (204).

14 Claims, 6 Drawing Sheets

(51) Int. Cl.
*B60W 10/14* (2012.01)
*B60W 30/18* (2012.01)

(52) U.S. Cl.
CPC ......... *B60W 40/06* (2013.01); *B60W 2520/10* (2013.01); *B60W 2720/403* (2013.01)

(56) References Cited

U.S. PATENT DOCUMENTS

| | | |
|---|---|---|
| 2004/0162187 A1 | 8/2004 | Suzuki |
| 2016/0244057 A1 | 8/2016 | Kelly et al. |
| 2019/0263268 A1 | 8/2019 | Fracchia et al. |
| 2020/0238823 A1 | 7/2020 | Imamura et al. |

FOREIGN PATENT DOCUMENTS

| | | |
|---|---|---|
| GB | 2523321 A | 8/2015 |
| GB | 2571328 A | 8/2019 |
| JP | S6460435 A | 3/1989 |
| JP | 2006325397 A | 11/2006 |
| JP | 2007161032 A | 6/2007 |
| JP | 2007209182 A | 8/2007 |
| JP | 2011189814 A | 9/2011 |
| JP | 2017038470 A | 2/2017 |
| WO | 2014027111 A1 | 2/2014 |
| WO | 2015025003 A1 | 2/2015 |
| WO | 2019162482 A1 | 8/2019 |

OTHER PUBLICATIONS

Combined Search and Examination Report under Sections 17 and 18(3) for Application No. GB2013081.1 dated Mar. 8, 2021.
Office Action dated Jan. 9, 2024 for JP Patent Application No. 2023-512467.

* cited by examiner

CONTROL SYSTEM FOR CONTROLLING TORQUE DISTRIBUTION

TECHNICAL FIELD

The present disclosure relates to a control system for controlling torque distribution in a vehicle. Aspects of the invention relate to a control system for controlling torque distribution, a vehicle, a method and to computer software.

BACKGROUND

It is known for an internal combustion engine to provide a negative engine torque under some conditions. In the context of the present application a negative engine torque is a torque which applies a force to decelerate the vehicle. This is most commonly when driving (not stationary) and in gear whereby the driver demanded drive torque is less than the required drive torque needed to deliver vehicle acceleration or to maintain the vehicle speed. This is known as overrun torque. The driver demanded drive torque is commonly based on the position of the accelerator pedal and the vehicle speed.

On low friction or loose surfaces, the delivery of overrun toque onto the drive wheels of a vehicle can be enough to generate an undesirable amount of slip at these drive wheels. It is an aim of the present invention to address one or more of the disadvantages associated with the known art.

SUMMARY OF THE INVENTION

Aspects and embodiments of the invention provide a control system, a method, a vehicle and computer software as claimed in the appended claims.

According to an aspect of the present invention there is provided a control system for controlling torque distribution between a first axle and a second axle in a vehicle, the control system comprising one or more controllers, wherein the control system is configured to: detect that the vehicle is in overrun; detect the vehicle speed; wherein when the vehicle is in overrun and the vehicle speed is below a first speed threshold then the torque distribution is controlled to reduce overrun torque to the first axle and to increase overrun torque to the second axle.

The change in torque distribution allows the vehicle to reduce the build up of a wedge of material in front of the wheels when the vehicle is travelling on a soft surface or terrain. This is particularly advantageous at low speeds as the vehicle comes to rest because it improves the ability of the vehicle to restart after stopping.

Optionally, the apparatus may comprise a control system described above wherein the first axle is a front axle and the second axle is a rear axle. Alternatively, the apparatus may comprise a control system described above wherein the vehicle is travelling backward, and the first axle is a rear axle and the second axle is a front axle.

Optionally, the apparatus may comprise a control system described above comprising: detecting that the vehicle is on an off-road surface; and varying the reduction in overrun torque to the first axle and the increase in overrun torque to the second axle dependent upon detecting an off-road surface.

Optionally, the apparatus may comprise a control system described above comprising: determining the vehicle deceleration rate; and varying the reduction in overrun torque to the first axle and the increase in overrun torque to the second axle dependent upon determining vehicle deceleration rate.

Measuring the deceleration rate can provide an indication of the softness of the surface and the gradient. These provide the advantage that the torque distribution is modified when appropriate to the conditions.

Optionally, the apparatus may comprise a control system described above wherein the overrun torque is increased on the second axle dependent upon the amount the overrun torque is reduced on the first axle.

It is beneficial to control the distribution of torque without significantly affecting the overall deceleration of the vehicle. By removing torque from one axle and adding a similar amount to the other axle this is achieved. A small deficit may be beneficial to compensate for the additional surface drag or gradient.

Optionally, the apparatus may comprise a control system described above wherein the overrun torque is increased on the second axle by the same amount the overrun torque is reduced on the first axle. Alternatively, the apparatus may comprise a control system described above wherein the reduction in overrun torque to the first axle is greater than the increase in overrun torque to the second axle if the gradient of the vehicle is above a threshold.

Optionally, the apparatus may comprise a control system described above wherein the amount of the overrun torque on the first axle is reduced by applying a drive torque to the first axle using one or more of a B-ISG, C-ISG or any electric machine integrated into the first axle arrangement.

Optionally, the apparatus may comprise a control system described above wherein the overrun torque to the second axle is caused by regenerative braking from an electric machine and/or friction braking.

A hybrid system may be beneficially used to distribute torque. The electrical energy generated by the ERAD may be used to drive the B-ISG, for example.

Optionally, the apparatus may comprise a control system described above wherein the reduction in overrun torque to the first axle and the increase in overrun torque to the second axle is dependent upon the vehicle speed being below a first speed threshold.

Soft surfaces behave differently depending on the speed of travel. It is beneficial to apply the torque distribution when required at lower speeds but not necessary at higher speeds where the wedge of soft material does not form in front of the wheels. Different surfaces and moisture content have differing speeds at which the wedge of material may form so may require different torque distributions or speed thresholds.

Optionally, the apparatus may comprise a control system described above wherein the first speed threshold is dependent upon the vehicle mode selected from one of Grass-Gravel-Snow (GGS), Sand, Mud and ruts, Rocks.

Optionally, the apparatus may comprise a control system described in the previous two paragraphs wherein the first speed threshold for GGS mode is between 0 kph and 70 kph, in sand mode the first speed threshold is between 0 kph and 50 kph, in mud and ruts mode the first speed threshold is between 0 kph and 55 kph and in rock mode the first speed threshold is between 0 kph and 30 kph.

Optionally, the apparatus may comprise a control system described above wherein the reduction in overrun torque to the first axle and the increase in overrun torque to the second axle are dependent upon the rate of vehicle deceleration.

Optionally, the apparatus may comprise a control system described above wherein the increase in overrun torque to the second axle is only performed when the vehicle deceleration rate is above 0.3 g and/or the vehicle speed is below 10 kph.

Optionally, the apparatus may comprise a control system described above wherein the reduction in overrun torque to the first axle and the increase in overrun torque to the second axle is dependent upon wetness of the off-road surface.

Optionally, the apparatus may comprise a control system described above wherein the reduction in overrun torque to the first axle and the increase in overrun torque to the second axle is discontinued when creep occurs.

According to another aspect of the invention, there is provided a vehicle comprising the control system described above.

According to another aspect of the invention, there is provided a method of controlling torque distribution between a first axle and a second axle in a vehicle, the method comprising: detecting that the vehicle is in overrun; detecting the vehicle speed; and when the vehicle is in overrun and the vehicle speed is below a first speed threshold, controlling the torque distribution to reduce overrun torque to the first axle and to increase overrun torque to the second axle.

According to another aspect of the invention, there is provided computer software that, when executed, is configured to perform the method described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A method of controlling torque distribution in a vehicle in accordance with an embodiment of the present invention is described herein with reference to the accompanying Figures.

Figure 1:
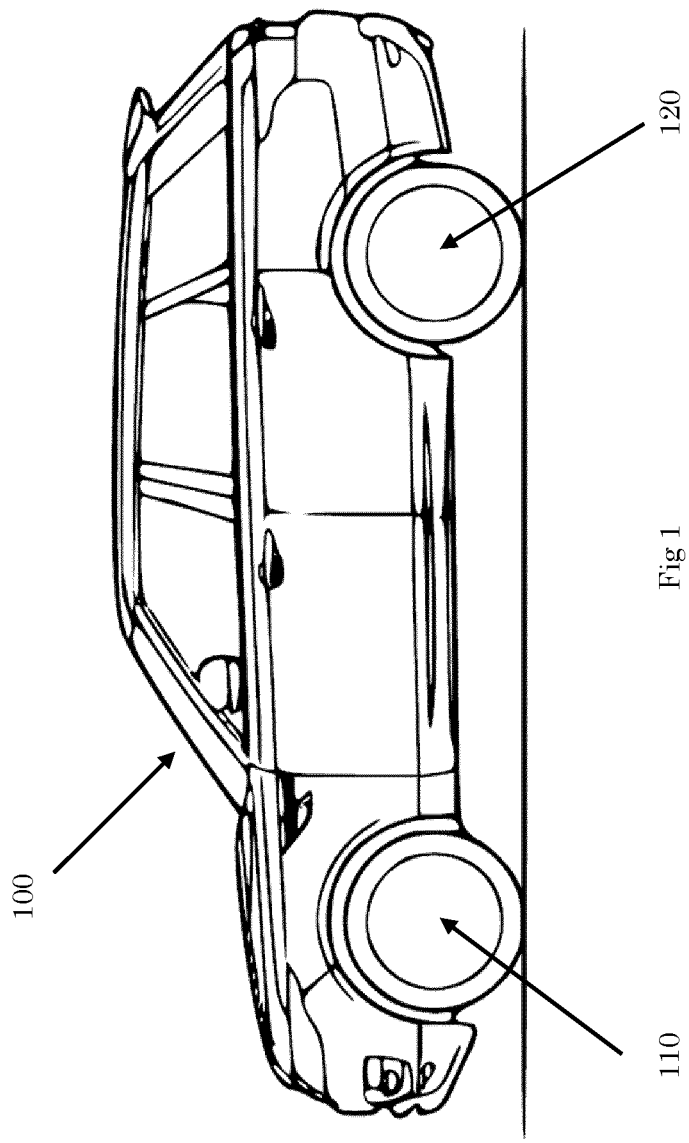
FIG. 1 shows a schematic illustration of a vehicle according to an embodiment of the invention in side view.

FIG. 1 shows a vehicle 100 according to an embodiment of the present invention. The vehicle 100 has a first axle 110 and a second axle 120, each axle having 2 wheels each, for example. In another embodiment the vehicle could have more than 2 axles which could provide the vehicle with 6 or 8 wheels or more, for example.

In this description the torque applied to an axle refers to the torque at the wheels, this includes any braking torque in addition to drive or overrun torque from an engine or motor.

Figure 2:
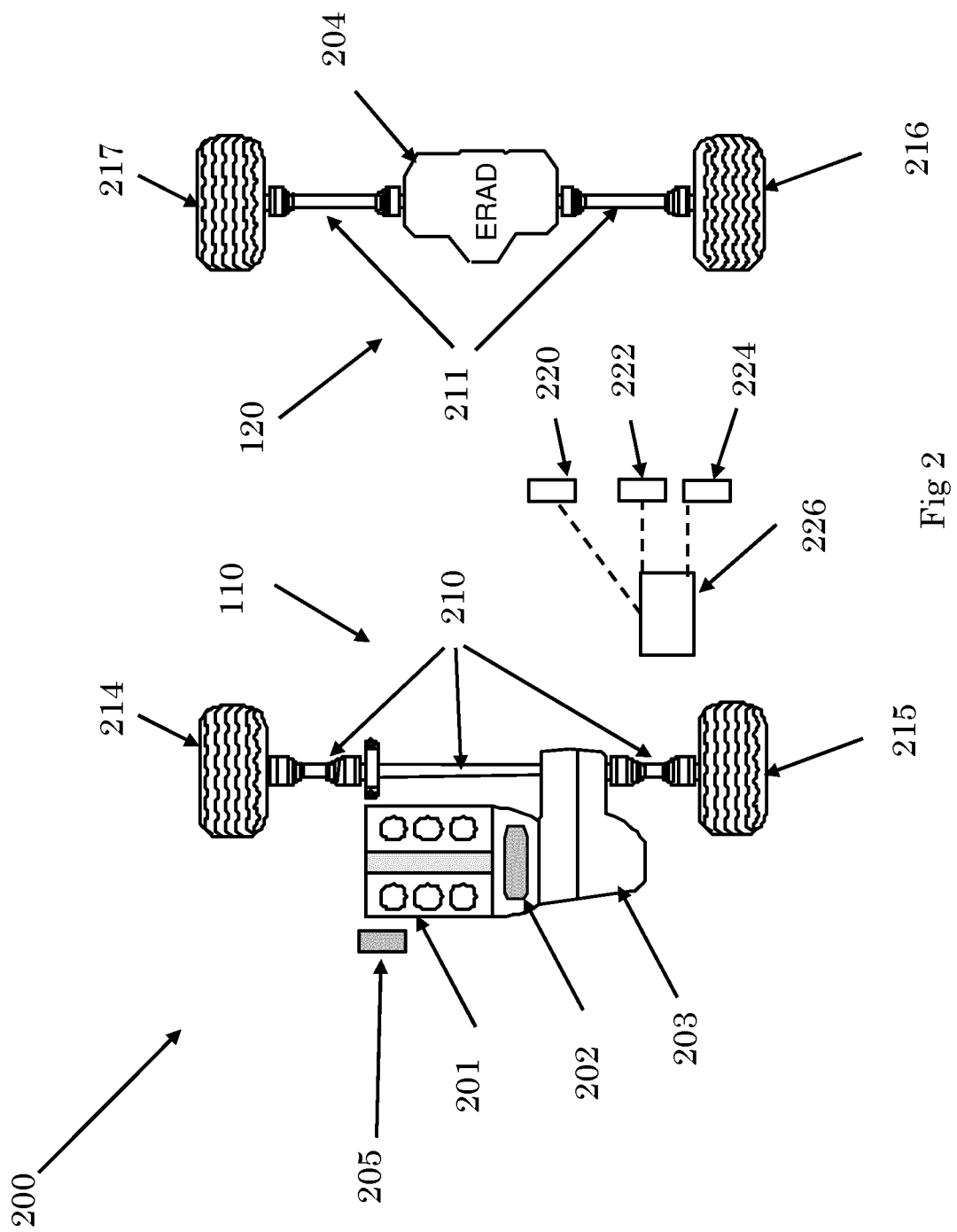
FIG. 2 shows an embodiment of a powertrain arrangement according to the invention.

FIG. 2 shows a powertrain 200 according to an embodiment of the present invention installed in the vehicle of FIG. 1. The powertrain 200 shown has an engine 201 connected to an electric machine 202 which is connected to a transmission 203. The transmission 203 in this embodiment is a FWD transmission which can distribute torque into a first axle 110 via a differential (not shown) and axle driveshaft components 210 to the front wheels 214, 215.

The electric machine 202 is a crank integrated starter generator (C-ISG) 202 which is a crankshaft connected electric machine located between the engine 201 and the transmission 203. The C-ISG may have a clutch to allow the engine to stop while the C-ISG provides drive torque to the transmission. Closing the clutch allows the engine to provide drive torque to the transmission and to the C-ISG. In this mode the C-ISG may provide additional torque or use some of the engine torque to charge the battery. A belt integrated starter generator (B-ISG) 205 is also shown installed which is a typically smaller electric machine which is mounted onto the engine and is connected to the engine via a drive belt from the B-ISG to the engine crankshaft pulley. In this embodiment both a C-ISG 202 and B-ISG 205 are shown but other embodiments may only have either a C-ISG or a B-ISG. In other embodiments the electric machine may be integrated into the transmission 203 arrangement or into the axle driveshaft components 210 both not shown.

A second axle 120 fitted to the vehicle in the embodiment may include an electric rear axle drive (ERAD) 204, driveshaft components 211 and rear wheels 216, 217. The ERAD 204 can provide either positive or negative electric drive torque through the second axle 120 and can act independently to the first axle 110 as there is no physical connection between the first axle 110 and the second axle 120. In another embodiment there could be a physical connection between the first axle and the second axle provided by a prop shaft and a centre differential arrangement (not shown), which is a conventional way of providing 4-wheel drive (4×4) transfer capability.

The ERAD 204 could include an electric machine capable of providing positive or negative torque to a transmission assembly which could either be a single speed or multiple speed transmission with and optional differential directing torque through the rear axle components 211 and then to the wheels 216, 217. In the embodiment shown the ERAD 204 could have the electric machine, transmission gear reduction and differential output integrated into a single unit. Outputs to the wheels 216, 217 are shown via driveshaft components 211.

In the embodiment described in FIG. 2 the first axle 110 and second axle 120 can drive independently and the torque distribution in each axle is separate. The first axle 110 in this example embodiment drives the front axle but in other embodiments could be the rear axle. The engine 201 output is connected to the C-IMG 202 input, the C-IMG 202 output is connected to the input of the transmission 203 and the output of the transmission 203 is connected to the front axle driveshaft components 210 via a differential (not shown). The front axle driveshaft components 210 are connected to the wheels 214 and 215.

This front axle arrangement has 3 possible torque sources being the engine 201 or the C-IMG 202 or the B-ISG 205. The following description will concentrate on use of the C-IMG 202 as a torque source but the B-ISG 205 could assist or replace the torque provided by the C-IMG 202 interchangeably.

The C-IMG 202 can provide positive or negative drive torque to the first axle 110 to make the vehicle drive forward or in reverse respectively. An optional clutch (not shown) between the C-IMG 202 and the engine may allow disconnection of the engine output from the input of the C-IMG which could allow the engine to be disconnected from the torque path and allow electric drive only from the C-IMG 202.

The arrangement of FIG. 2 is also able to provide positive drive torque or negative drive torque to the front axle 110 from the engine 201, wherein the positive drive torque is a product of the driver demanding positive drive torque using the throttle and the negative drive torque is caused by the frictional losses in the engine experienced during engine overrun and some reduced driver throttle demands. Engine overrun is a condition whereby when driving (not stationary) and in gear and the driver demanded drive torque is less than the required drive torque needed to deliver vehicle acceleration or to maintain the vehicle speed. The level of overrun torque is a result of the frictional and pumping losses from the engine when there is reduced throttle demand. The engine 201 may be able to drive positive or negative torque into the input of the C-IMG 202 which will be transferred to the output of the C-IMG 202 and then through the transmission 203, via the differential (not shown) and into the driveshaft components 210 to the wheels.

Torque in the front axle 110 can be provided by either the engine 201, C-IMG 202 or a combination of the engine 201 and C-IMG 202. A second embodiment may include a Belt integrated starter generator (B-ISG) 205 which could drive the front axle 110 by adding positive or negative torque to the engine. Engine torque can also be provided to the C-IMG 202 or B-ISG 205 to provide electrical charge to a battery or vehicle electrical system.

In certain driving conditions and on loose surfaces like sand, gravel, shale, soil, mud and rocks it is possible for the progress of the vehicle to be hindered as wheels or axles can sink into the ground. This can be exacerbated by uncontrolled torque inputs causing deformation to the surface.

For example, the vehicle described in FIG. 2 has a conventional engine connected to the front axle which has an amount of overrun braking torque acting on the front axle assuming no throttle is being applied by the driver. In a high friction surface environment it is possible that a vehicle configured as in FIG. 2 could be propelled on the rear axle 120 only which in this example is via the ERAD 204, this ERAD can deliver the driver demanded positive motor torque and also if required a simulated engine over run negative torque. When encountering road surfaces that provide a lower surface friction a vehicle as described in FIG. 2 would enable both axles to provide drive torque delivering a 4-wheel drive level of vehicle stability. This recognition of the surface condition could be acknowledged either by the driver selecting a vehicle mode or by the vehicle selecting a mode automatically. Whilst providing drive torque from both axles in this configuration the vehicle would only be able to provide over run toque via the first axle connected to the internal combustion engine as the internal combustion engine generates the friction and pumping losses. In this case the engine is the only source of overrun braking and the overrun torque will only act on the front axle as there is no mechanical connection between the front and rear axles. This overrun braking is caused by the natural frictional and pumping losses from the engine and acts as a negative decelerating torque on the vehicle. At low speeds this decelerating torque acting on the wheels associated with the first axle can start to deform the road surface at the point of contact with the tyres and build a wedge of deformable material in front of the wheel and as the vehicle comes to rest this wedge of material in front of the wheel can increase the rate at which the front axle decelerates and can be a problem when the car next attempts to pull away. The wedge of material can act as a hindrance to vehicle motion as it forms a material barrier which the wheel needs to overcome or drive over to move the vehicle.

Overrun torque can still occur even when small throttle demands are being made by the driver so for example it may be that the driver is demanding 50 Nm of engine combustion torque using the throttle at a speed when the engine friction torque is −80 Nm. In this case the net decelerating torque for the vehicle is −30 Nm.

In an alternative embodiment the engine provides drive through a drive shaft to the rear axle and an electric axle drive is provided at the front axle. In this configuration the same control method may be applied to distribute torque between the axles in the opposite direction to the previous description. Therefore, the torque distribution may be to the rear at high speed and the C-IMG may reduce overrun torque to the rear axle as the vehicle slows below a threshold. The front axle drive may then provide an overrun torque to compensate for the torque reduction of the C-IMG. As before, a B-ISG may provide the function of the C-IMG.

Figure 2A:
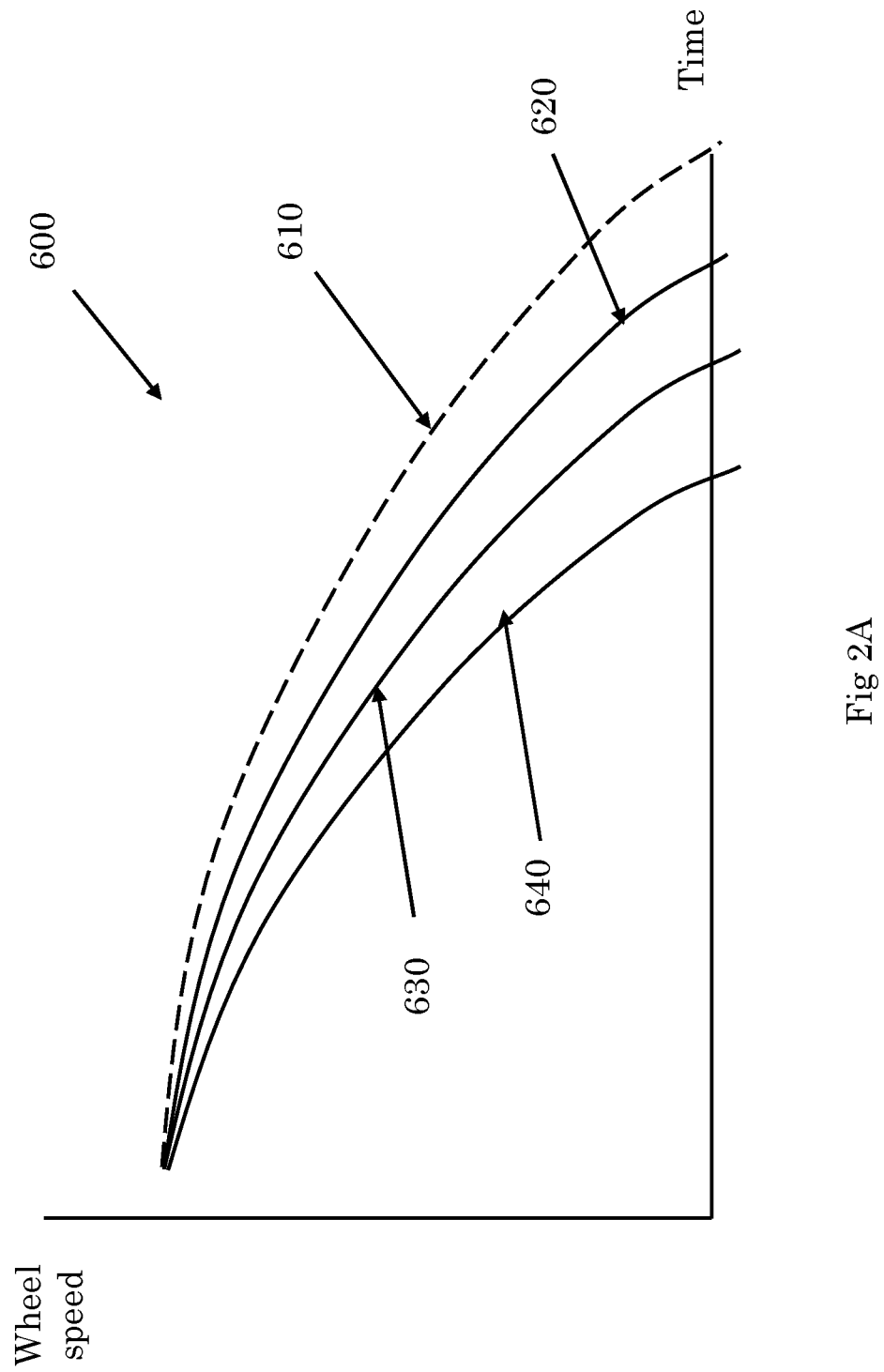
FIG. 2A shows an example of vehicle coast down speed versus time graph, during overrun on various surfaces.

FIG. 2A shows an example of vehicle coast down speed versus time graph 600, during overrun on various surfaces. The term coast down describes the deceleration profile of a vehicle on a flat surface with zero brake and throttle application with the gear box in an appropriate gear. The deceleration forces acting on the vehicle are aerodynamic drag, wheel rolling friction, driveline losses and engine overrun. FIG. 2A shows a comparison of coast down curves for various example surfaces like tarmac 610, wet grass 620, mud 630 and sand 640. It can be seen from FIG. 2A that mud 630 and sand 640 slow the vehicle down quicker. This graph does not show the entry to creep torque that would be delivered as part of the inherent qualities of an automatic gearbox. Typically, the wheels experiencing a negative overrun torque during deceleration on a low friction surface or loose surface structure start to experience wheel slip and this wheel slip is part of the mechanism that starts to form a material wedge in front of the wheel during deceleration. For example, the tarmac surface 610 will have a coast down deceleration curve where there will be very little surface drag due to the high stiffness surface. Mud 630 and sand 640 show coast down curves which are progressively faster than tarmac 610 which are indicative of higher drag surfaces with more of a tendency to form a material wedge in front of the wheel during deceleration which can increase the rate of deceleration as the wedge increases in size.

Where surfaces are wet or very soft the material wedge in front of the wheel can increase as does the amount of slip between the wheel and the surface. Overrun torque being applied to the wheel will further increase slip and the size of the wedge formed. This then results in a higher surface drag.

The vehicle 100 is fitted with a throttle system 220 and a means of detecting throttle position like a potentiometer which is connected to a vehicle control unit (VCU) 226. The vehicle is fitted with a brake system 222 which is able to operate a hydraulic braking system. Additionally, the brake system 222 is connected to the VCU 226 which is able to request a torque from the C-IMG 202 and the ERAD 204.

The VCU 226 is in communication with the engine 201, C-IMG 202, B-ISG 205 and ERAD 204 and is able to dynamically request positive or negative torque from these units as required.

The vehicle 100 may be fitted with a 3 axis or 6 axis accelerometer 224 which is able to detect acceleration, deceleration and determine the speed of the vehicle from the wheel speed sensors or a traction motor speed resolver. The VCU using known calculation methods can also determine gradient (inclination) and yaw motion of the vehicle.

Figure 3:
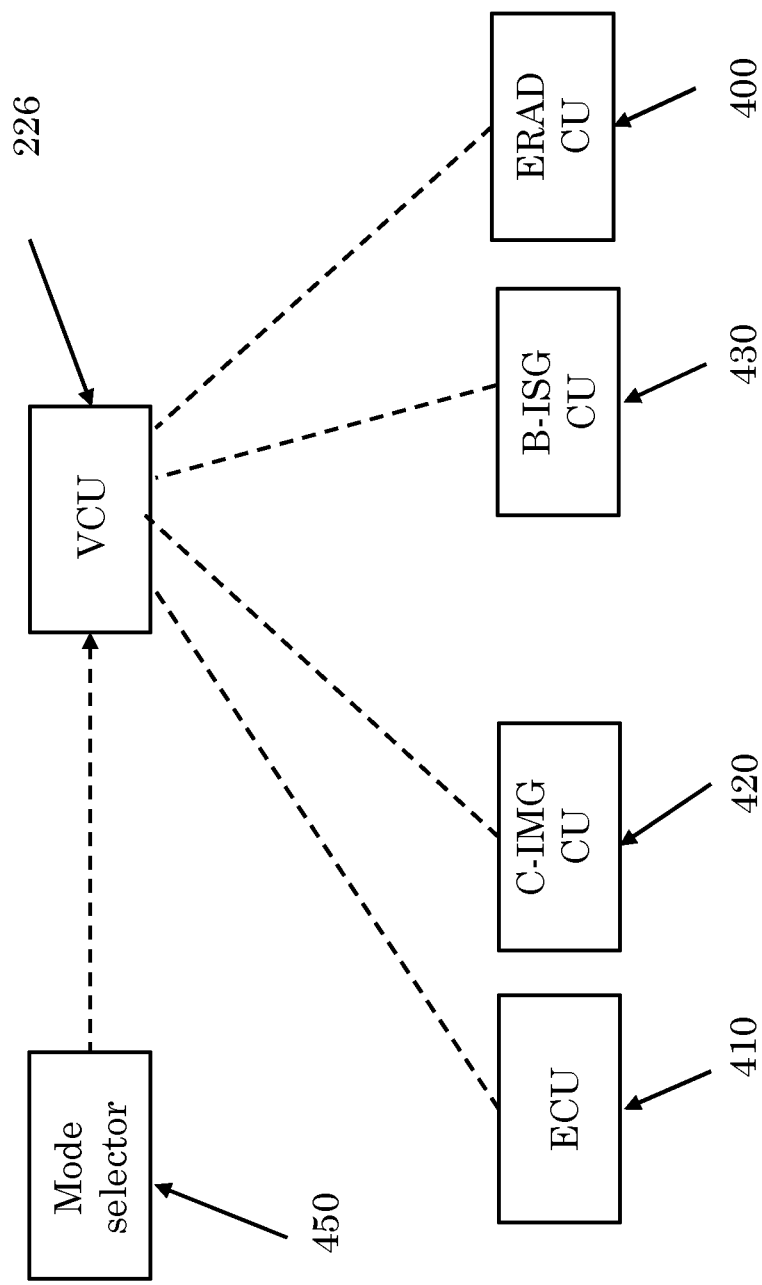
FIG. 3 shows an example control system for the powertrain shown in FIG. 2.

FIG. 3 shows an example control system for the powertrain shown in FIG. 2. The vehicle control unit (VCU) 226 is in communication with the Engine Control Unit (ECU) 410 and is able to demand engine torque from the engine 201 when the throttle system 220 demands it. The vehicle control unit (VCU) 226 is in communication with the C-IMG 202 Control Unit 420 and can request either positive or negative torque from the C-IMG 202. The vehicle control unit (VCU) 226 is in communication with the B-ISG 205 Control Unit 430 and can request either positive or negative torque from the B-ISG 205. The vehicle control unit (VCU) 226 is in communication with the ERAD 204 Control unit 400 and can request either positive or negative torque from the ERAD 204. An off-road mode selector 450 is shown on FIG. 3 which is able to select vehicle off road modes like sand, mud and ruts, snow, grass/gravel/snow. The off-road mode selector 450 communicates with the VCU 226 to allow the driver to indicate which type of surface they intend to drive on. The vehicle may also have an "auto" mode which is automatically selected by the vehicle, based on the surface it is travelling over or predicts it will be travelling over. The driving mode selected may determine the torque distribution between the front axle 110 and the rear axle 120 in a way that best suites the surface.

In this context a vehicle is off-road when at least one front wheel and at least one rear wheel is travelling over and in contact with any surface other than tarmac or concrete. This may occur when sand is blown across a tarmac road or when the driver places two wheels on the shoulder of a road.

While FIG. 3 shows a physical embodiment of the control system, the control functions performed may be distributed across a different architecture. Controllers may be combined or distributed, and several different networks may be employed to perform the same function. Similarly control software functions may be performed in different controllers where processing capacity, memory space and/or network communications are available. For example, the VCU is shown as a separate controller but the functions performed by the VCU could be implemented in the ECU, removing the need for a separate VCU.

Figure 4:
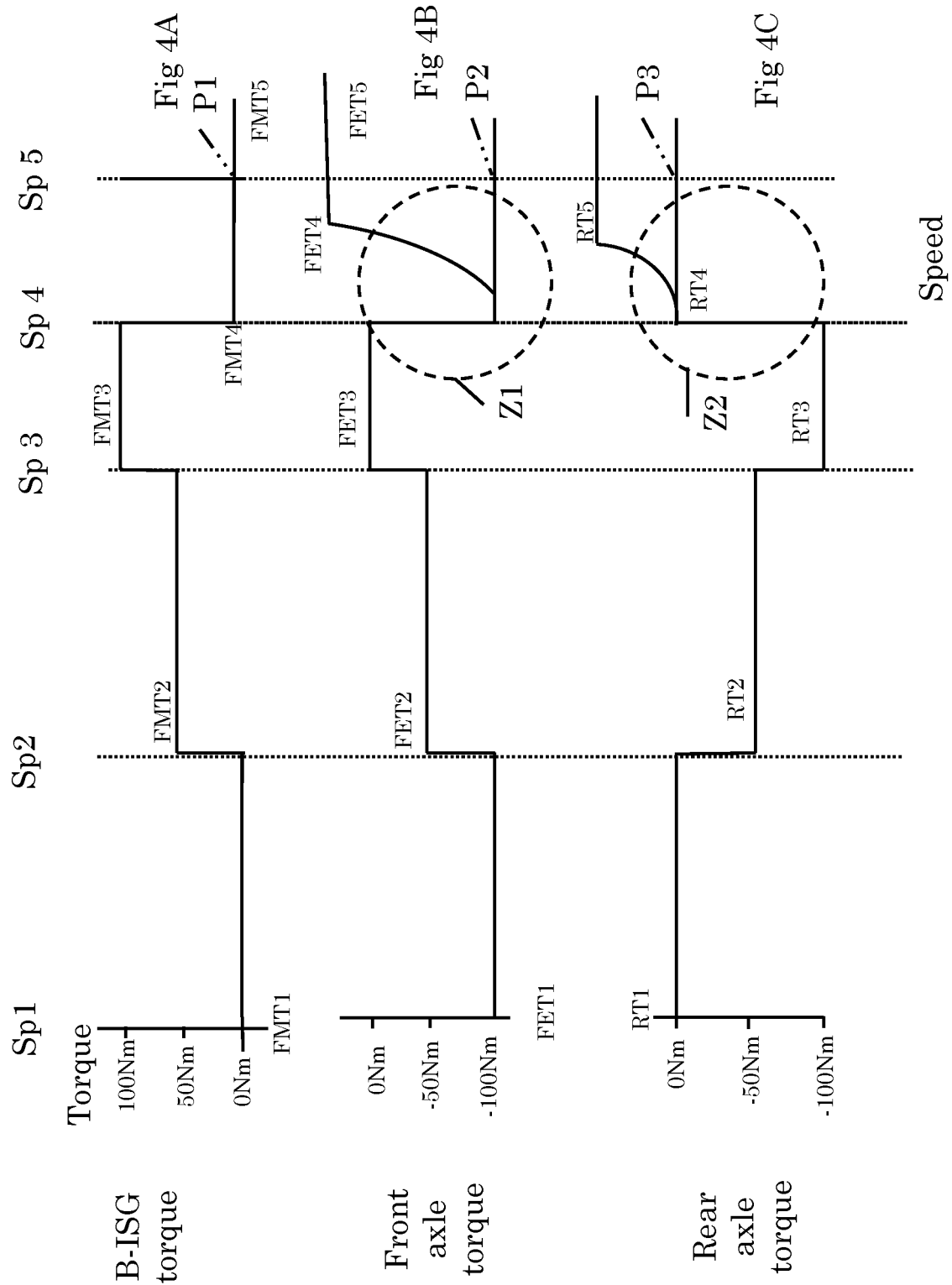
FIG. 4A shows a graph of front axle motor torque during vehicle deceleration while the vehicle is travelling over a loose surface and example control strategy of an embodiment of the invention.
FIG. 4B shows a graph of front axle engine torque during vehicle deceleration while the vehicle is travelling over a loose surface and example control strategy of an embodiment of the invention.
FIG. 4C shows a graph of rear axle motor or brakes torque during vehicle deceleration while the vehicle is travelling over a loose surface and example control strategy of an embodiment of the invention.

FIGS. 4A, 4B and 4C combined shows one possible motor torque distribution control method which could mitigate the problem of building a wedge of deformable material in front of one or more wheel during vehicle deceleration for sand for example. Each of the FIGS. 4A, 4B and 4C share the same timeline as the motor torque distribution control method needs to be coordinated between the front axle 110 and rear axle 120.

FIG. 4A shows a graph of B-ISG motor torque during vehicle deceleration while the vehicle is travelling over a loose surface. During the vehicle deceleration the vehicle passes through various speed thresholds being Sp1, Sp2, Sp3 and Sp4 for example which will trigger various control responses. At various points during the control strategy the front axle motor torque will vary to example levels of FMT1, FMT2, FMT3, FMT4 in dependence on the driving situation.

FIG. 4B shows a graph of front axle torque. This is the sum of the engine torque (not shown) and the B-ISG torque of FIG. 4A. Between Sp1 and Sp3 the engine provides an overrun torque of −100 Nm. Conventionally, as the vehicle comes to rest after SP4 the engine overrun torque transitions to provide a creep torque at FET4 (if creep is provided).

FIG. 4C shows a graph of rear axle torque which is either from brakes application or rear axle motor torque or both. An example control strategy will now be described using all 3 graphs (4A, 4B and 4C).

In an embodiment the vehicle may be on an off road surface like sand, gravel/snow, soil, mud and ruts and when the vehicle decelerates it is possible for some or all of the wheels to deform the surface and build up a wedge of the loose surface in front of the wheels. While the vehicle has a high speed and inertia it is usual for the vehicle to pass along the surface without too much resistance to motion but when the vehicle slows down it is possible for the vehicle to sink into the surface. Additionally, during deceleration the wedge of material can build more rapidly and at higher vehicle speeds due to the negative torque encountered at the wheels, this negative torque and the low friction surface causes the drive wheels to rotate at a speed that is slower than the vehicle speed, this wheel slip (or under rotation) allows the loose surface to build up in front of the drive wheels rather than allowing the drive wheels to roll over the top of the wedge. This overrun torque at low vehicle speed tends to push any loose off-road surface in front of the wheel instead of the wheel rolling over it, causing a wedge of material to form in front of the wheel. Additionally, if the vehicle is travelling in a forward direction and the vehicle is decelerating then there is a weight transfer from the rear wheels to the front wheels which tends to push the front wheels further into the off-road surface. This effect exacerbates the material wedge build up in front of the problem wheels which in this case is being experienced on the front axle as the engine overrun torque flows through the front axle. As another example, if the vehicle had a rear axle driven by the engine then the rear axle would be the axle which could tend to form the material wedge build up in front of the rear wheel during overrun deceleration.

This wedge of material causes a resistance to a vehicle pulling away once it is stopped and also can decelerate a vehicle more rapidly than the driver is intending to stop as indicated by the driver demanded brake pressure, we are seeking to mitigate this issues with a method of controlling torque distribution in a vehicle during deceleration.

FIGS. 4A, 4B and 4C describe an example method of wheel torque control to counteract the material wedge build up during deceleration on sand as an example. The deceleration condition could be zero throttle demand, the driver brake request could be zero and the forward vehicle speed could be 30 kph at the speed point Sp1 on FIG. 4A. The wheel torque distribution at Sp1 is FET1=−100 Nm and RT1=0 Nm which is a net negative overrun deceleration torque for the vehicle applied to the front axle of −100 Nm. In this condition the overrun torque is being experienced on the front axle only and the vehicle is moving reasonably quickly such that the overrun torque may not cause a material build up in front of the front wheels. There is no overrun torque being experienced in the rear axle as speed point Sp1.

As there is no throttle being applied the vehicle will slow down until speed point Sp2 due to frictional drag from the surface on the wheels and the overrun torque produced from the engine pumping losses. Speed point Sp2 could be 20 kph. At speed point SP2 the torque distribution in the front axle 110 and rear axle 120 changes such that front axle motor torque FMT2=50 Nm this positive torque is applied to the engine by the B-ISG (alternatively this may be a C-IMG) directly resulting in the front axle torque FET2=−50 Nm. The B-ISG torque inputs a positive torque value into the internal combustion engine (ICE) partially cancelling out the −100 Nm pumping and friction losses this results in an overall front axle torque in this instance −50 Nm torque. At the same time the rear axle torque is changed to RT2=−50 Nm. So at Speed point Sp2 the net vehicle torque is −100 Nm with −50 Nm on the front axle 110 and −50 Nm on the rear axle 120. It is noted that the B-ISG torque which in this example is delivered by an electric motor could also be delivered by allowing the ICE to be supplied with combustible fuel and air, this 'fueled' state of the engine could be configured to provide part or all of the positive torque as described in this example cancelling part or all of the overrun torque on the ICE powered (front) axle.

Moving to speed point Sp3 which could be around 15 kph, the axle torque distribution changes again to FET3=0 Nm and RT3=−100 Nm. Therefore, the overrun torque for the vehicle=−100 Nm via the brakes or ERAD applying −100 Nm to the rear axle. The 0 Nm being applied at the front axle (a combination of 100 Nm B-ISG torque and −100 Nm ICE torque) delivers the expected deceleration torque of the vehicle, this will reduce the build-up of material under the leading contact point of the front wheels and also allows the front wheels to roll over some or all of the wedge of material in front of the wheels of the front axle.

Moving to speed point Sp4 which could be around 7 kph and also the speed point at which a "creep" function may start to develop a positive drive torque. "Creep" is shown on FIG. 4B at torque FET4 as an automatically requested engine torque to deliver a forward motion in the vehicle as is common in most automatic transmission equipped vehicles. When the VCU 226 receives a creep torque instruction then the VCU 226 may cancel the method of controlling torque distribution in a vehicle as described in the invention as the modes may not be compatible, creep torque could be initiated at any time within Zone 1 as marked on FIG. 4B but it is known that depending on the surface wedge build up, the incline and weight of the vehicle and other vehicle inputs the entry to creep function may start at other times not shown in Z1. FIGS. 4A and 4C show that at speed Sp5 when creep is operating, FMT5=0 Nm, FET5=20 Nm and RT5=20 Nm. Depending on driving mode the creep may be provided by the front axle, the rear axle or both. For example, the stop start system may request the ICE to switch off and creep be provided by the rear axle. Conversely if the traction battery has a low state of charge, the ICE may continue to run and provide the creep torque. In a low friction situation creep torque from both axles may be preferred. This torque would be delivered so as to provide a seamless creep function for the driver, It would be possible to deliver the introduction to creep torque on one axle whilst completing the pressure modifications on the other axle as long as this did not interfere with the drivers expected torque delivery. The creep function torque delivery on the E-RAD could be introduced at any point of Zone 2 (Z2) shown in FIG. 4C but it is known that depending on the surface wedge build up, the incline and weight of the vehicle and other vehicle inputs the entry to creep function may start at other times not shown in Z2. Therefore, there is a net acceleration torque due to the creep torque functionality but the method of controlling torque distribution in a vehicle as described in the invention may be cancelled.

As the vehicle speed reduces at SP4 the vehicle overrun torque is moved away from the rear axle 120 and back onto the front axle 110. This allows the rear wheels in this example to roll up and on top of any wedge of surface material that has built up in front of the wheels of the rear axle due to the full overrun torque being delivered by these wheels as the vehicle comes to a stop.

Depending on the surface gradient and vehicle speed that the distribution of torque may not be as described in this embodiment and that there are many factors that may need to be taken into account to enable control on the torque distribution, these could include known wheel and tyre size, tyre pressure, wheel base and vehicle weight amongst other inputs. Not all steps of this function may need to be initiated if for example the second axle had wider tyres than the first or was significantly lighter as may be the case in an unloaded pick-up truck.

Where a vehicle does not have a creep function or where the soft surface drag torque is higher than the creep torque the vehicle will come to rest (0 kph) shown at SP5 positions P1, P2, P3. There would be no negative or positive torque being transferred into the axles 110, 120, except for the creep torque function which is not part of the proposed invention. Therefore FMT5=0 Nm, FET5=20 Nm and RT5=20 Nm. It is known that when the creep torque is insufficient to enable the motor to rotate with the torque request it has then the motor will prevent the torque request from being actioned, this prevents the build-up of heat and saves energy. As an electric machine can respond to changes in the drive torque request faster than the ICE then there is no perceptible loss of performance when the driver requests additional torque.

In this example the proposed method of controlling torque distribution in a vehicle is discontinued at speed point Sp4 (for example 7 kph) however the invention could be discontinued at other speeds dependent upon the surface, off road mode selected or the ambient conditions of the vehicle.

Although in FIG. 4A-4C Sp4 shows the torque control returning to front axle overrun in one event there may be alternative torque distributions to enable the best stopping position of the wheels on the soft surface.

Torque changes may include a blending function that controls the rate at which a change in torque is delivered at each step, this control makes the change less perceptible by the driver or other vehicle occupants.

The above torque distribution strategy, on a vehicle driving forward, redistributes the torque away from the front wheels 214, 215 which are most likely to form a material wedge in front of the wheel to the rear wheels. This will maintain a consistent net deceleration torque profile for the vehicle. As the vehicle speed reduces the net deceleration torque for the vehicle may change in a similar way to other vehicles but at the same time the balance of negative decelerating torque distribution moves rearwards to the rear axle. All vehicles experience a deceleration caused by overrun braking and usually the amount of braking is dependent upon the speed of the running engine, the selected gearbox gear, final drive ratios and the frictional pumping losses at that engine speed. The proposed control strategy would not affect the net negative decelerating torque for the vehicle and in this way the driver will not feel any difference to the vehicle deceleration due to the torque redistribution. The invention does not preclude modification of the total overrun torque where that may be desired. Similarly the vehicle deceleration on a soft surface may differ due to the torque distribution of the present invention because material does not build up in front of the wheels, this has the benefit of the overrun behaviour being closer to the expectation of the driver based on experience of overrun on hard surfaces.

In another embodiment, if the vehicle were travelling backwards then the leading wheels would be the rear wheels 216, 217 on the rear axle 120 and the control distribution would be reversed. For example, if the vehicle were travelling in reverse the leading wheels 216, 217 would be driven in reverse by the ERAD 204 and the trailing wheels would be powered in reverse by the engine 201 and/or the C-IMG 202 and/or B-ISG 205. If the vehicle were travelling in reverse then the engine 201 overrun torque could still be a problem for the front axle 110 as the engine running while driving in reverse could still produce a torque that would cause the wheels 214, 215 to build a wedge of material in front of them. To reduce or prevent this wedge of material, the engine overrun torque (in reverse) could still be counteracted by the C-IMG 202 and/or the B-ISG 205 producing a counter torque. The ERAD would provide torque to compensate for the B-ISG or C-IMG torque.

In some embodiments the surface the vehicle is driving on influences the VCU 226 control strategy. In an example embodiment described in FIG. 5, starting at step 500 the VCU 226 determines at step 510 the surface the vehicle is driving on and the proposed torque distribution method only applies if the vehicle is driving on certain surfaces. The method of torque distribution control may be dependent upon the off-road mode detected or selected by the driver at step 505. For example, the VCU 226 may determine through observing wheel speed signals that wheels on the vehicle are slipping intermittently and from this the VCU 226 may determine that the vehicle is on a loose surface. Alternately the driver may operate the off-road mode selection manually via a switch, push button or other input to select 'Auto', GGS, Sand, Rock, Dynamic, Mud and Ruts. 'Auto' is an automatic terrain response selection which allows the VCU 226 to select the most appropriate terrain mode automatically when the VCU 226 recognises that the vehicle is on a given type of surface. Auto terrain recognition uses many inputs from the vehicle sensors to detect the surface type and friction level including but not limited to the wheel speed sensors, GPS, lateral and longitudinal acceleration signals, pitch heave and yaw signals as well as environmental inputs like temperature and air pressure. These could be inputs to the VCU 226 which will allow it to select the most appropriate terrain mode to maximise traction based on the best selectable mode from the GGS, Sand, Rock, Dynamic, Mud and Ruts for the terrain. The control method could also be a combination of multiple selective criteria from the other control maps.

At step 515 overrun detection takes place by either looking at the engine torque map, the ECU 410 or by detecting there is no throttle 220 input detected for example. The VCU 226 then determines at step 520 whether the vehicle is in overrun and if the answer is yes then the VCU 226 goes to step 530.

In some embodiments the speed of the vehicle is a factor that influences the VCU 226 control strategy. In an example embodiment described in FIG. 5 the VCU 226 determines at step 530 the speed of the vehicle and the proposed torque distribution method only applies if the speed is below a threshold. The speed threshold may be dependent upon the off-road mode detected or selected by the driver. For example in dynamic mode the speed threshold may be between 0 kph and 80 kph, in Grass gravel snow (GGS) mode the speed threshold may be between 0 kph and 70 kph, in sand mode the speed threshold may be between 0 kph and 50 kph, in mud and ruts mode the speed threshold may be between 0 kph and 55 kph, in rock mode the speed threshold may be between 0 kph and 30 kph. The speed threshold for each mode may also vary dependent upon inclination of the vehicle and whether the terrain is wet of dry.

In some embodiments the rate of deceleration of the vehicle is a factor that influences the VCU 226 control strategy and the method of controlling torque distribution in the vehicle. In an example embodiment described in FIG. 5B the VCU 226 determines at step 540 the deceleration rate of the vehicle and the proposed torque distribution method only applied if the deceleration rate is greater than a threshold. The deceleration rate threshold target may be dependent upon the off-road mode detected or selected by the driver. For example the deceleration rate threshold for GGS may vary between 0.9 and 0.2 g limits, or deceleration rate threshold for sand may vary between 0.9 and 0.15 g limits, or deceleration rate threshold for mud and ruts may vary between 0.9 and 0.2 g limits, or deceleration rate threshold for rock mode may vary between 0.9 and 0.05 g limits. Other limits may apply and may vary dependent upon inclination of the vehicle and whether the terrain is wet of dry.

Figure 5:
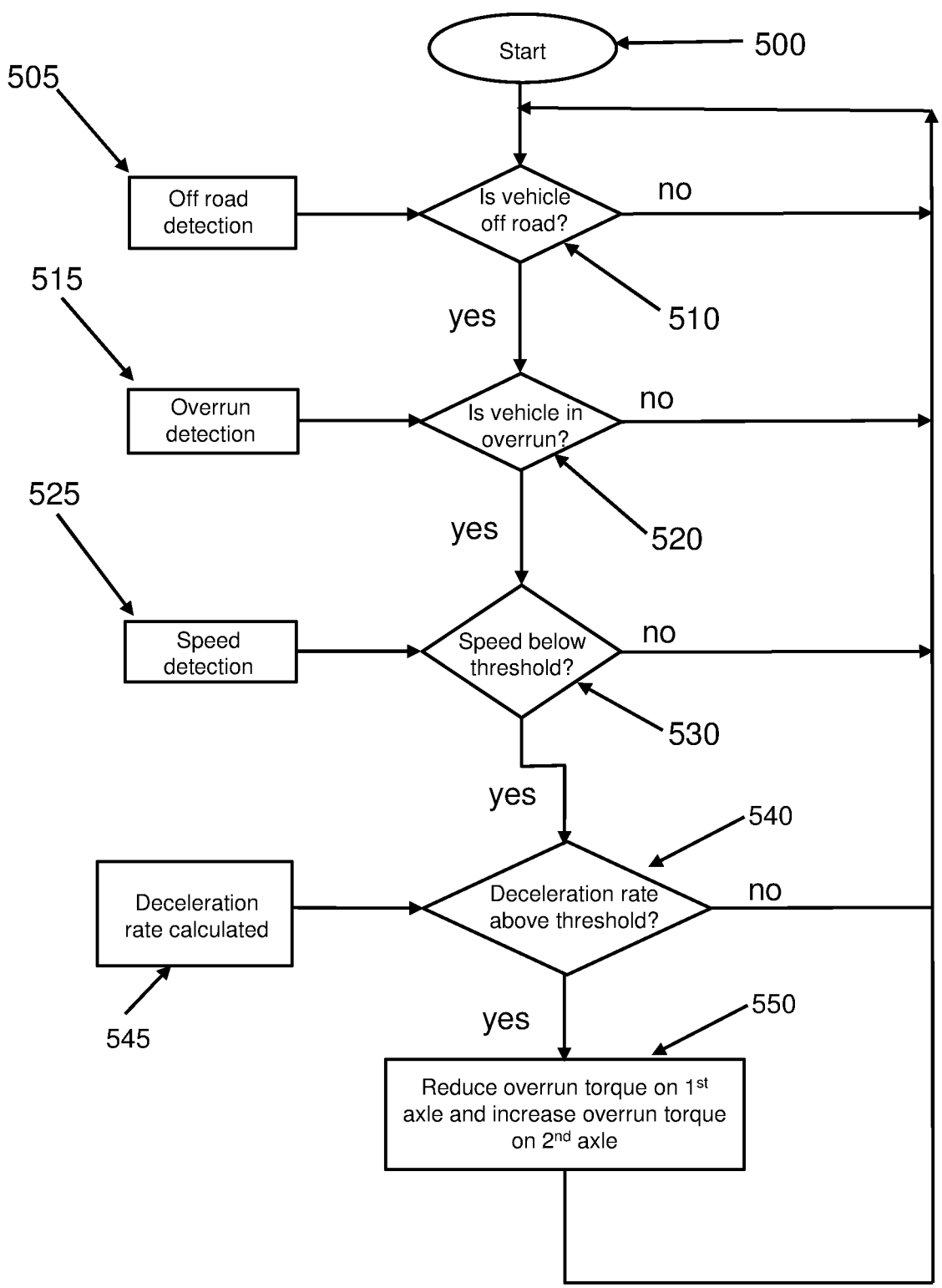
FIG. 5 shows an example control flow diagram for controlling the powertrain shown in FIG. 2.

FIG. 5 shows a control method of operation for an example embodiment of the invention. Step 500 is the start of the control sequence and could be initiated when the vehicle ignition is on. Step 500 may switch all or the controllers on and commence communications between all controllers 400, 410, 420, 430 and 226.

Other control architectures may apply.

At step 510 the VCU 226 determines if the vehicle is off-road using the means of off-road detection 505. If the vehicle is determined to be off-road, then the VCU moves to step 520 where the VCU determines if the overrun detection means 515 detects that the vehicle engine 201 is in overrun. If the VCU determines the engine 201 is in overrun, then the VCU 226 moves to step 530 where the VCU determines if the vehicle speed detection means 525 detects that the vehicle speed is below a threshold at step 530. If the VCU 226 determines the vehicle speed is below a threshold at step 530 then the VCU 226 moves to step 540 which looks at the calculated deceleration rate means 545 and determines if the deceleration rate of the vehicle is greater than a threshold at step 540. If the deceleration rate of the vehicle is greater than a threshold then the VCU 226 moves to the next step where the VCU 226 instructs the C-IMG 202 and/or B-ISG 205 to increase the torque on the first axle 110 and instructs the ERAD 204 to reduce torque on the second axle 120.

If at any of the decision steps 510, 520, 530 or 540 the analysis is negative then the VCU 226 controller returns to step 510 to repeat the process.

In an embodiment the vehicle may be on a gradient which may determine how the overrun torque on the first axle is counteracted and how the amount of braking torque on the second axle is controlled. For example, if the vehicle were driving forwards on a steep upward slope then there may be a shift in the centre of gravity (COG) of the vehicle to the rear of the vehicle. In this example the reduced downward force on the first (front) axle 110 and the increased downward force on the second (rear) axle 120 could mean that the tractive limits of the first and second axle could have changed. For example, if the downward force on an axle reduces then the amount of torque a given wheel can transmit to the ground will reduce and vice versa if the downward force on an axle increases then the amount of torque a given wheel can transmit to the ground will increase.

In this example the method of controlling torque distribution in a vehicle may need to take account of this changing axle downward force distribution due to vehicle incline otherwise there is a risk of wheel slip and loss of traction.

The amount of positive torque to the first axle may be reduced more than the amount of torque reduced on the second axle if the gradient of the vehicle is above a threshold. This will take into account the weight distribution change in the vehicle and the downward force available in each axle of wheel to ensure there is no loss of traction. For example, if the vehicle were moving forward up an incline then the COG would move backwards in the car reducing downward force on the front axle and increasing downward force on the rear axle. This would reduce the amount of available traction on the front axle and increase the amount of available traction on the rear axle.

In an embodiment, the vehicle speed may determine when the method of controlling torque distribution in a vehicle is initiated. For example, it may be that above a certain speed threshold the torque distribution in the vehicle is unchanged from a normal vehicle but when the vehicle slows down to below a speed threshold then the method of controlling torque distribution in a vehicle is initiated and the torque distribution is changed.

The speed threshold may be circa 10 kph, 5 kph or within a speed range depending on driving conditions. The speed point thresholds sp1, sp2, sp3 and sp4 are examples only and these values could vary dependent upon which surface the car was being driven on or which terrain response mode the vehicle was in.

For example, a surface like sand may be regarded as being softer than a compacted gravel and although both surfaces may experience material build up in front of wheels during overrun braking conditions, the sand may develop a wedge of material sooner and the speed threshold (Sp1, Sp2, Sp3 Sp4) would be higher than for compacted gravel.

In an embodiment, the rate at which a vehicle decelerated during overrun braking may determine when the method of controlling torque distribution in a vehicle is initiated. For example, if the vehicle decelerates quickly then this could indicate that the surface was softer (like sand) and was absorbing the vehicle's rolling energy because of increased frictional losses at the wheels. If the controller detected that the deceleration rate was higher than a deceleration threshold then the method of controlling torque distribution in a vehicle is initiated.

Vehicle deceleration could be measured by an on-board accelerometer 224 or by monitoring wheel speed sensor outputs. Deceleration could be measured in meters per second squared or "g" where 1 g equals 9.81 meters per second squared.

A method of controlling wheel torque in a vehicle for example is, if the amount of the negative engine overrun torque on the first axle is counteracted by increasing positive torque to the first axle and torque is reduced on the second axle only when either the vehicle deceleration rate is above 0.3 g and/or the vehicle speed is below 10 kph.

The vehicle will have a controllable braking system on each axle which may be electrical, electromechanical or hydraulic (not shown).

It will be appreciated that various changes and modifications can be made to the present invention without departing from the scope of the present application.

The invention claimed is:

1. A control system for controlling torque distribution between a first axle and a second axle in a vehicle, the control system comprising one or more controllers, wherein the control system is configured to:
   detect that the vehicle is in overrun;
   detect the vehicle speed;
   wherein, when the vehicle is in overrun and the vehicle speed is below a first speed threshold, the torque distribution is controlled to reduce overrun torque to the first axle and to increase overrun torque to the second axle; and
   vary how the torque distribution is controlled to reduce overrun torque to the first axle and to increase overrun torque to the second axle dependent upon detecting that the vehicle is on an off-road surface.

2. The control system according to claim 1, wherein the control system is configured to vary how the torque distribution is controlled to reduce overrun torque to the first axle and to increase overrun torque to the second axle dependent upon determining a deceleration rate of the vehicle.

3. The control system according to claim 1, wherein the overrun torque to the second axle is increased dependent upon an amount the overrun torque to the first axle is reduced.

4. The control system according to claim 1, wherein the overrun torque to the second axle is increased by the same amount the overrun torque to the first axle is reduced.

5. The control system according to claim 1, wherein the overrun torque to the first axle is reduced an amount that is greater than an amount the overrun torque to the second axle is increased if the gradient of the vehicle is above a threshold.

6. The control system according to claim 1, wherein the overrun torque to the first axle is reduced by applying a drive torque to the first axle using one or more of a belt integrated started generator, a crank integrated starter generator or any electric machine integrated into the first axle arrangement.

7. The control system according claim 1, wherein the overrun torque to the second axle is caused by regenerative braking from an electric machine and/or friction braking.

8. The control system according to claim 1, wherein the first speed threshold is dependent upon a mode of the vehicle selected from one of GGS, Sand, Mud and ruts, Rocks.

9. The control system according to claim 1, wherein reducing the overrun torque to the first axle and increasing the overrun torque to the second axle are dependent upon a rate of vehicle deceleration.

10. The control system according to claim 1, wherein
    the vehicle is on an off-road surface and
    reducing the overrun torque to the first axle and increasing the overrun torque to the second axle is dependent upon a wetness of the off-road surface.

11. The control system according to claim 1, wherein reducing the overrun torque to the first axle and increasing the overrun torque to the second axle is discontinued when creep occurs.

12. A vehicle comprising the control system according to claim 1.

13. A method of controlling torque distribution between a first axle and a second axle in a vehicle, the method comprising:
- detecting that the vehicle is in overrun;
- detecting the vehicle speed;
- when, the vehicle is in overrun and the vehicle speed is below a first speed threshold, controlling the torque distribution to reduce overrun torque to the first axle and to increase overrun torque to the second axle; and
- varying how the torque distribution is controlled to reduce overrun torque to the first axle and to increase overrun torque to the second axle dependent upon detecting that the vehicle is on an off-road surface.

14. A non-transitory storage medium containing computer-executable instructions that, when executed at least one processor, causes the at least one processor to perform the method of claim 13.

* * * * *